Feb. 27, 1940.  B. HOFFMANN  2,192,042

FLUID CONTROL MECHANISM

Filed July 19, 1937

Inventor:
Bruno Hoffmann
by Harry E. Dunham
His Attorney.

Patented Feb. 27, 1940

2,192,042

UNITED STATES PATENT OFFICE 2,192,042

FLUID CONTROL MECHANISM

Bruno Hoffmann, Spandau, Germany, assignor to General Electric Company, a corporation of New York Application July 19, 1937, Serial No. 154,516
In Germany September 25, 1936

2 Claims. (Cl. 137—153)

The present invention relates to fluid control mechanisms for controlling the pressure or like condition of fluid conducted from a source to a consumer. The invention is of special significance in connection with elastic fluid power plants in which elastic fluid turbines are supplied with fluid from a source of fluctuating pressure.

The object of my invention is to provide an improved construction and arrangement of fluid control mechanisms which is simple in construction and efficient in operation.

For a consideration of what I believe to be novel and my invention, attention is directed to the following description and the claims appended thereto in connection with the accompanying drawing.

Figure 1:
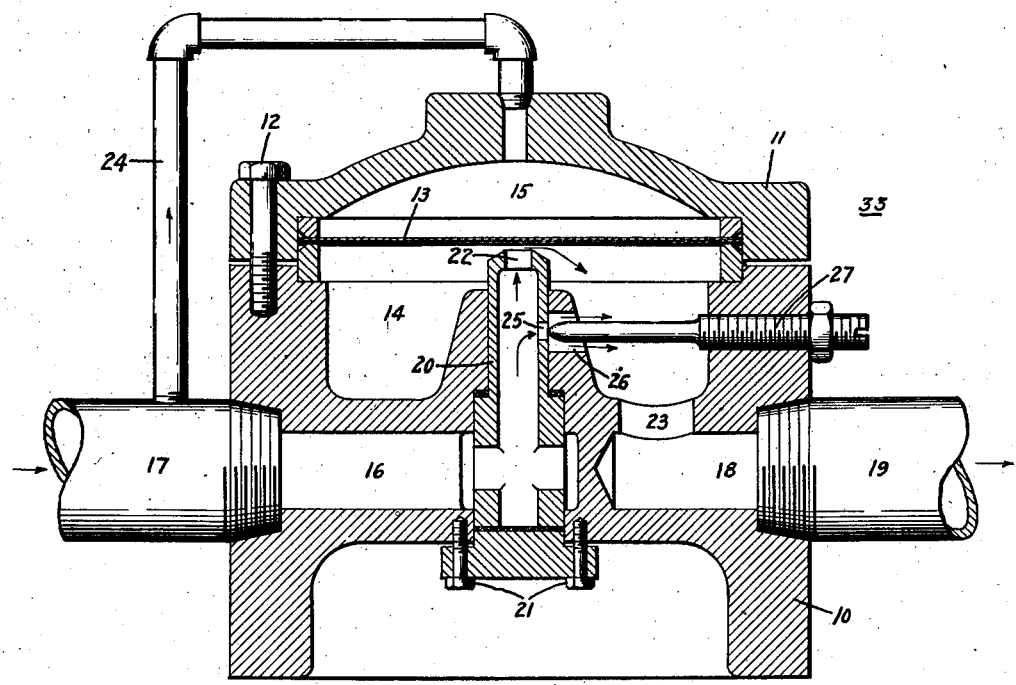
Figure 2:
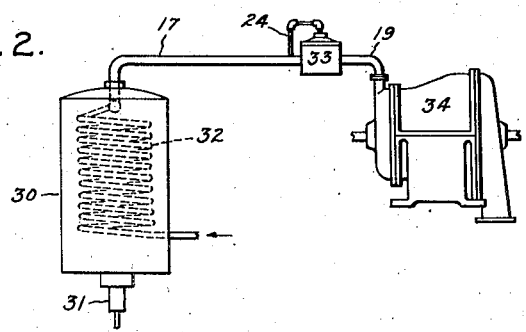

In the drawing, Fig. 1 shows a sectional view of a fluid control mechanism embodying my invention, and Fig. 2 shows an application of the mechanism for controlling the pressure of elastic fluid conducted from a source to a turbine.

The arrangement comprises a casing 10 with a cover 11 secured to the casing by bolt means 12. A diaphragm 13 is clamped between the casing 10 and the cover 11 and defines therewith two spaces or chambers 14 and 15. The lower portion of the casing 10 forms an inlet channel 16 to which elastic fluid is conducted from a source by a conduit 17 secured to the casing, and an outlet channel 18 through which fluid is discharged to an outlet conduit 19 which may be connected to a turbine or like consumer. The inlet channel 16 communicates with the discharge channel 18 in accordance with my invention through the space 14 below the diaphragm 13. The space 14 forms a part of the fluid path from the source to the consumer. Fluid is conducted from the inlet channel 16 to the space 14 by a tube or tubular member 20 secured to the casing 10 and held in position by means including bolts 21. The upper end of the tube 20 forms an opening or orifice 22 in close proximity to and directed against a central portion of the lower surface of the diaphragm 13. The tube together with the diaphragm 13 forms in substance a valve or nozzle. The space 14 communicates with the outlet channel 18 through an opening 23.

The space 15 above the diaphragm 13 communicates in the present instance with the inlet conduit 17 through a pipe 24 whereby the upper surface of the diaphragm is subjected to the fluid pressure in the conduit 17 and the inlet channel 16. The diaphragm 13 is so mounted as to normally permit unrestricted flow.

During operation, fluid flows from the conduit 17 through the inlet channel 16 and the tube 20 into the space 14, whence it flows through the opening 23 and the outlet channel 18 into the discharge conduit 19. During low pressure condition in the inlet conduit 17 and accordingly in the space 15 the diaphragm 13 is slightly flexed upward and therefore offers little resistance to the discharge of fluid from the opening 22. If now the fluid pressure in the conduit 17 increases, the diaphragm 13 being subject to this fluid pressure is forced downward, thereby decreasing the space between the lower surface of the diaphragm and the opening 22 of the tube 20. This effects throttling of the fluid pressure discharged from the tube 20 into the space 14 whereby the pressure in the space 14 and consequently in the discharge conduit 19 is maintained substantially constant during fluctuations of the pressure in the inlet conduit 17.

My invention further includes the provision of a bypass for fluid with regard to the orifice 22. This is accomplished by the provision of an opening 25 in the side wall of the tube 20 which communicates through an opening 26 in the casing directly with the space 14. With this arrangement a part of the fluid flows from the inlet channel 16 through the opening 25 in the tube 20 directly into the space 14 without passing through the orifice 22. The amount of fluid thus bypassed may be controlled by means of a needle valve 27 adjustably secured to the casing 10. The provision of such bypass is especially desirable during starting operation of a turbine or like consumer connected to the outlet conduit 19 because the bypass permits a quick flow of fluid through the control mechanism.

My invention is especially important when used for controlling the pressure of elastic fluid ahead of the nozzles of small steam turbines. The cost of ordinary valve and pressure control mechanisms is prohibitive in arrangements including small steam turbines. I have found that the pressure of the elastic fluid supplied to such turbines can be accurately controlled by the provision of my fluid controlling mechanism ahead of the inlet nozzles of such turbines. An arrangement of this kind, as shown in Fig. 2, comprises an elastic fluid generator 30 having a burner 31 and a heating element 32 in the present instance shown as a coil. Elastic fluid discharged from the heating element is conducted through a fluid control mechanism 33 to a small elastic fluid turbine 34. The fluid control mechanism 33 is arranged in close proximity to the turbine 34 and has its inlet conduit 17 connected to the generator and its outlet conduit 19 connected to the turbine. This mechanism permits control of the elastic fluid supply to the turbine and, as explained above, eliminates fluctuations of the pressure of the elastic fluid discharged from the elastic fluid generator.

Thus, with my invention I have accomplished an improved construction and arrangement of elastic fluid control mechanisms whereby the pressure or like condition of an elastic fluid may be readily controlled. The mechanism comprises a device responsive to changes of a fluid condition and includes a diaphragm or like element which at the same time forms a part of a valve or nozzle to be adjusted in response to changes of a fluid condition.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Fluid control mechanism including the combination of a casing with a cover, a flexible diaphragm held between the casing and the cover to form a first and a second space therewith, means for conducting fluid from a source to a consumer comprising an inlet channel and an outlet channel formed in the casing, means connecting the inlet channel with the outlet channel comprising the first space and a tubular member having an inlet communicating with the inlet channel and an outlet orifice opening towards a central portion of the diaphragm, the diaphragm at low pressure in the inlet channel offering little resistance to the flow of fluid through the outlet orifice, means connecting the second space to the inlet channel to cause deflection of the diaphragm in the direction of the outlet orifice with increasing fluid pressure in the inlet channel, and means including an opening in the side wall of the tubular member for bypassing a part of the fluid with regard to said orifice.

2. Fluid control mechanism including the combination of a casing and a cover, a flexible diaphragm held in the casing and the cover and forming a first and a second space therewith, an inlet channel and an outlet channel formed in the casing, means for conducting fluid from the inlet channel through the first space to the outlet channel comprising a tubular member having a conically shaped end face forming a sharp edge orifice closely spaced with a central portion of the diaphragm to discharge fluid received from the inlet channel towards the surface of the diaphragm, the diaphragm at low pressure in the inlet channel offering little resistance to the flow of fluid through the outlet orifice, means subjecting the second space to a condition of the fluid in the inlet channel to cause deflection of the diaphragm in response to changes of the fluid condition in the inlet channel, and adjustable means including an opening in the side wall of the tubular member and a needle valve for bypassing a part of the fluid with regard to the orifice.

BRUNO HOFFMANN.